United States Patent
Daum

(10) Patent No.: US 7,837,970 B2
(45) Date of Patent: Nov. 23, 2010

(54) PROCESS AND PLANT FOR THE PRODUCTION OF SULPHURIC ACID

(75) Inventor: Karl-Heinz Daum, Mainz (DE)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 11/816,693

(22) PCT Filed: Feb. 11, 2006

(86) PCT No.: PCT/EP2006/001260
§ 371 (c)(1),
(2), (4) Date: Sep. 2, 2008

(87) PCT Pub. No.: WO2006/087150
PCT Pub. Date: Aug. 24, 2006

(65) Prior Publication Data
US 2009/0269272 A1    Oct. 29, 2009

(30) Foreign Application Priority Data
Feb. 21, 2005    (DE) .................. 10 2005 008 109

(51) Int. Cl.
*C01B 17/43* (2006.01)
*C01B 17/69* (2006.01)
*C01B 17/74* (2006.01)

(52) U.S. Cl. .................. 423/573.1; 423/522; 423/528

(58) Field of Classification Search .................. None
See application file for complete search history.

(56) References Cited

U.S. PATENT DOCUMENTS

| | | | |
|---|---|---|---|
| 2,180,727 A | 11/1939 | Carter | 23/175 |
| 2,655,431 A | 10/1953 | Allen et al. | 23/168 |
| 3,490,868 A | 1/1970 | Furkert | 23/168 |
| 3,780,499 A | 12/1973 | Dorr et al. | 55/32 |

(Continued)

FOREIGN PATENT DOCUMENTS

DE    1054431    4/1959

(Continued)

OTHER PUBLICATIONS

PCT International Search Report, International Application No. PCT/EP2006/001260, mailed Nov. 28, 2006.

(Continued)

*Primary Examiner*—Melvin C Mayes
*Assistant Examiner*—Sheng Han
(74) *Attorney, Agent, or Firm*—Leydig, Voit & Mayer, Ltd.

(57) ABSTRACT

The invention relates to a process and plant for producing sulphuric acid by catalytic oxidation of $SO_2$ to form $SO_3$ in a converter with at least one contact stage, the $SO_3$-containing process gas, after it has passed through at least one contact stage, being withdrawn from the converter and fed to an apparatus for recovering heat, in which steam is generated from feedwater by means of the heat of the process gas, and the process gas then being fed to an absorber, in which the $SO_3$ is absorbed in sulphuric acid. To improve the utilization of heat during the production of sulphuric acid, the feedwater is fed to the heat recovery apparatus at a higher temperature than the process gas fed to the absorber.

18 Claims, 14 Drawing Sheets

U.S. PATENT DOCUMENTS

| | | | |
|---|---|---|---|
| 3,788,043 A | 1/1974 | Dorr et al. | 55/237 |
| 3,875,294 A | 4/1975 | Reh et al. | 423/534 |
| 3,907,979 A | 9/1975 | Jenninges | 423/522 |
| 4,285,927 A | 8/1981 | Hara et al. | |
| 4,368,183 A | 1/1983 | Dorr et al. | 423/522 |
| 4,576,813 A | 3/1986 | McAlister et al. | |
| 4,654,205 A * | 3/1987 | Cameron | 423/522 |
| 4,670,242 A | 6/1987 | McAlister et al. | |
| 4,996,038 A | 2/1991 | McAlister et al. | 423/522 |
| 5,538,707 A * | 7/1996 | McAlister | 423/522 |
| 5,593,652 A | 1/1997 | Peng | 423/522 |
| 6,153,168 A * | 11/2000 | Seitz et al. | 423/522 |
| 6,279,514 B1 | 8/2001 | Browder et al. | 122/7 |
| 6,500,402 B1 * | 12/2002 | Winkler et al. | 423/522 |

FOREIGN PATENT DOCUMENTS

| | | |
|---|---|---|
| DE | 30303 | 10/1963 |
| DE | 15 67 716 | 7/1970 |
| DE | 20 50 580 | 4/1972 |
| DE | 2 223 131 | 5/1972 |
| DE | 22 13 580 A1 | 3/1975 |
| DE | 28 20 231 | 5/1978 |
| DE | 30 00 599 | 7/1980 |
| DE | 29 45 021 | 5/1981 |
| DE | 3303289 | 8/1984 |
| DE | 691 05 961 | 10/1991 |
| DE | 3830365 C2 | 6/1996 |
| DE | 19522 927 | 1/1997 |
| DE | 198 00 800 | 7/1999 |
| DE | 102004012293 | 9/2005 |
| EP | 0218411 | 4/1987 |
| EP | 0130967 B1 | 1/1988 |
| EP | 0181313 B1 | 1/1988 |
| GB | 21 81 120 A | 4/1987 |
| RU | 2040465 C1 | 7/1995 |
| RU | 2119890 C1 | 10/1998 |
| RU | 2201393 C1 | 3/2003 |
| RU | 2217383 C1 | 11/2003 |
| SU | 1583351 A1 | 8/1990 |
| SU | 1782303 A3 | 12/1992 |
| WO | WO 91/14651 | 10/1991 |
| WO | WO 2004/037719 | 5/2004 |

OTHER PUBLICATIONS

Elvers, B. Ullmann's Encyclopedia of Industrial Chemistry; vol A 25, Sulfuric Acid and Sulfur Trioxide 655-668 1992.

Derwent Publications Ltd. An 2002-032802, XP002269015 & RU 2174 945, Abstract Oct. 20, 2001.

Connock, L., "Systems for Enhanced Energy Recovery", *Sulphur*, Sulphuric Acid Technology, British Sulphur Publishing Co, London, GB, No. 278, pp. 41-47 (Jan.-Feb. 2002) XP-001075186.

U.S. Appl. No. 11/592,290, filed Aug. 23, 2007, Karl-Heinz Daum et al.

U.S. Appl. No. 11/579,435, filed Aug. 21, 2007, Karl-Heinz Daum et al.

* cited by examiner

PROCESS AND PLANT FOR THE PRODUCTION OF SULPHURIC ACID

This application claims the benefit of International Application No. PCT/EP2006/001260 filed on Feb. 11, 2006 under 35 U.S.C. §371, entitled, "PROCESS AND PLANT FOR THE PRODUCTION OF SULPHURIC ACID" which claims benefit of German Patent Application No. 10 2005 008 109.6 filed on Feb. 21, 2005.

FIELD OF THE INVENTION

The invention relates to a process and a plant for the production of sulphuric acid by catalytic oxidation of $SO_2$ to form $SO_3$ in a converter with at least one contact stage, the $SO_3$-containing process gas, after it has passed through at least one contact stage, being withdrawn from the converter and fed to an apparatus for heat recovery, in which steam is generated from feedwater by means of the heat of the process gas, and the process gas then being fed to an absorber in which the $SO_3$ is absorbed in sulphuric acid.

Sulphuric acid is usually produced by what is known as the double absorption process, as described in Ullmann's Encyclopedia of Industrial Chemistry, $5^{th}$ Edition, Volume A 25, pages 635 to 700. Sulphur dioxide ($SO_2$) obtained by combustion of sulphur or as a waste gas from metallurgical plants is converted into sulphur trioxide ($SO_3$) in a four-stage or five-stage converter with the aid of a solid catalyst, for example comprising vanadium pentoxide as active component. After the contact stages of the converter, the $SO_3$ obtained is withdrawn and fed to an intermediate absorber or, after the last contact stage of the converter, to a final absorber, in which the gas containing $SO_3$ is passed in countercurrent to concentrated sulphuric acid and absorbed therein.

Plants for producing sulphuric acid from elemental sulphur in economic terms "suffer" from the fact that the costs of the raw material sulphur often significantly exceed the income which can be realized from the product sulphuric acid.

These plants can be operated economically only by maximizing/optimizing the generation of by-products, such as high-pressure and low-pressure steam, and thereby generating additional income.

In the past, considerable efforts have been made to utilize the heat released during the oxidation (combustion) of elemental sulphur to form $SO_2$ by means of atmospheric oxygen and the heat released during the catalytic oxidation of $SO_2$ to form $SO_3$ as completely as possible for the generation of high-pressure steam. Various pieces of apparatus, for example evaporators, economizers (boiler feedwater preheaters) and steam super heaters are in this case connected up in a suitable way for the generation of steam, with process engineering boundary conditions being the main determining factors. For example, the predetermined reaction temperatures for catalysis need to be complied with, and within certain limits the desired steam quality (e.g. pressure and temperature) also has to be taken into account. This steam can then be converted into electrical energy in a known way by means of a turbo alternator. If, for example, elemental sulphur is used as starting material, depending on the process and steam quality produced (pressure and temperature), generally about 60% of the energy which was originally present in the sulphur is utilized for steam generation. The degree of energy conversion for the generation of high-pressure steam is restricted by the limited options for cooling the process gas prior to the intermediate or final absorption. To prevent the temperature from dropping below the sulphuric acid dew point, for example, the process gases should not be cooled to below 130-170° C. A further restriction results from the use of deaerated boiler feedwater (i.e. boiler feedwater from which dissolved oxygen has been substantially removed) in the steam generators (e.g. economizers), which is necessary in order to avoid corrosion on the water side. The so-called unpressurized (typically 0.1-0.3 bar, all pressures are given relative to atmospheric pressure) thermal deaeration of the feedwater which is generally used means that the temperature of the feedwater is approximately 102-105° C. In thermodynamic terms, therefore, significant, economically justifiable gas cooling to below 130° C. would hardly be possible even without taking into account dew point corrosion.

During the subsequent part of the conventional process for producing sulphuric acid, the gases are cooled further both during the intermediate absorption and during the final absorption. This sensible energy, like the energy from the condensation of the $SO_3$ and the heat released through the energy of formation of $H_2SO_4$ from $SO_3$ and $H_2O$ and the dilution of the sulphuric acid formed, is consequently at a low temperature level and is generally removed from the process indirectly by means of cooling water.

In the past, various processes have been developed for also obtaining some of this heat as low-pressure steam, and thereby overall increasing the economic viability of the plant, cf. in this respect U.S. Pat. No. 4,576,813 held by Monsanto (also EP 0 181 313 B1) and the "HEROS" process developed by Lurgi in accordance with DE 38 30 365 C2. Numerous attempts have been made to improve these processes, but these modifications have hitherto been of only limited use. Reference may be made to the Monsanto patent U.S. Pat. No. 4,670,242. (EP 0 130 967 B1) and the Outokumpu process in accordance with the as yet unpublished German patent application DE 10 2004 012 293.8. Depending on the process engineering circuit and quality of the low-pressure steam (generally saturated steam at 6-10 bar), it is possible to increase the overall efficiency from approx. 60% to up to 80-85%. However, the use of these low-temperature heat recovery processes is restricted to situations in which there are available consumers for low-pressure steam, which is of a reduced quality. If this is not the case, the low-pressure steam can of course also be fed to a turbo alternator, but on account of the low steam pressure this is generally not very economical. Consequently, the majority of plants which are currently in operation are not equipped with such systems.

The remainder of the heat generated in the sulphuric acid production, amounting to 15-20%, is generally dissipated to cooling water and thereby withdrawn from active use. A small amount of this heat, can additionally be recovered by fresh, "cold" feedwater (typically 20-30° C. as return from for example condenser of a condensation turbine/alternator) being indirectly heated with the "hot" sulphuric acid (typically 80-110° C.) before this feedwater then passes to the thermal deaeration. Preheating to above, for example, 85-90° C. is not possible, since the atmospheric thermal deaeration still requires a certain temperature increase of 10-20° C. in order for this deaeration to be operated efficiently and effectively. Therefore, this additional degree of heat recovery is also limited.

SUMMARY OF THE INVENTION

It is an object of the present invention to further improve the utilization of heat in the production of sulphuric acid.

The invention substantially achieves this object by the features of Claims 1 and 19, with the temperature of the feedwater fed to the heat recovery apparatus for steam generation being higher than the temperature of the process gas which enters the absorber.

As a result, it is possible to increase the proportion of higher-quality high-pressure steam which is generated and to use heat which is conventionally utilized only for the generation of low-pressure steam for this purpose. At the same time, the amount of low-pressure steam can be kept approximately constant, which ultimately leads to a lower heat loss (for example to cooling water).

With otherwise identical boundary conditions, in the process according to the invention the thermal deaeration of the boiler feedwater is carried out for example at higher temperature or higher pressure. As a result, it is possible to pre-heat the "cold" feedwater by means of low-temperature heat to a much higher temperature of, for example, 165° C. (compared to conventionally 85° C.). This in turn ultimately allows a higher temperature of, for example, 175° C. of the boiler feedwater passed into the plant for high-pressure steam generation. For the same total available heat quantity, it is as a result possible to increase the quantity of high-pressure steam which is generated compared to the conventional process with boiler feedwater which is at only approx. 105° C.

As an alternative to pressure deaeration, it is of course also possible for the deaerator to continue to be operated at atmospheric pressure, but in this case downstream the boiler feed pump the feedwater is to be heated to a higher inlet temperature (into the economizer) by means of heat exchangers using the low-pressure steam. Naturally, the maximum temperature in this context is slightly below the temperature which can be achieved for the same low-pressure steam pressure during pressure deaeration.

However, this gives rise to a thermodynamic obstacle, since boiler feedwater of, for example, 175° C. can no longer be utilized to cool the process gases to 130-170° C. for example in an economizer. Therefore, the invention also relates to possible ways of indirectly getting round this obstacle and as a result still ensuring the above-described increased production of high-pressure steam.

According to a preferred configuration of the invention, the temperature difference between feedwater and the process gas which enters the absorber is between 5° C. and 100° C., preferably 20-50° C.

According to the invention, the feedwater is fed to the high-pressure part of the heat recovery apparatus at a temperature of over 102° C., preferably 140-1900C., with the process gas preferably being withdrawn from the converter at an intermediate contact stage, fed to an intermediate absorber and then being fed back into the converter, and the process gas, after it has passed through the final contact stage of the converter, being fed to a final absorber, with the gas inlet temperature at the intermediate absorber being approximately 130-170° C. and at the final absorber being approximately 120-150° C.

Before it enters the heat recovery apparatus, the feedwater is thermally deaerated, preferably at a feed temperature of 20-90° C., which then rises to, for example, 102-105° C. during the deaeration.

In a particularly preferred configuration of the invention, the cold feedwater which has not been deaerated, by contrast, is preheated to over 105° C. preferably to 130-190° C., and in particular to approximately 165° C., before it enters the thermal deaeration, in which case the maximum preheating temperature of the feedwater is preferably approximately 5 to 20° C. below the steam saturation temperature for the pressure at which the deaerator is operated, so that the function of thermal deaeration is still retained.

The preheating of the cold feedwater before it enters the thermal deaeration according to the invention is carried out indirectly by means of waste heat from the absorption part and/or the contact part of the sulphuric acid plant.

In a refinement of the invention, the thermal deaeration of the feedwater is operated at a pressure which is higher than atmospheric pressure, preferably at 3-10 bar.

In another embodiment, the feedwater is deaerated under atmospheric conditions and before it enters the heat recovery apparatus is heated in a heat exchanger to a temperature above the temperature of approximately 105° C. produced during the deaeration.

In this case, the heating of the feedwater is carried out, for example, by means of low-pressure steam, imported waste steam, medium-pressure steam (at a pressure below the pressure of the high-pressure steam generated in the plant) or heated heat-transfer oil originating from outside the plant.

According to the invention, the economizers are arranged in such a way that in thermodynamic terms it is possible to transfer the excess heat out of the process, with the degree of excess heat which is transferred being comparable to that of a conventional plant involving the thermal feedwater deaeration being operated at atmospheric pressure.

The gases which emerge from the heat recovery apparatus are preferably at a temperature of approximately 170-350° C., which is equal to or above ($\geqq 171°$ C.) the conventional temperatures of 120-170° C., and the further cooling of these gases (and hence indirect heat recovery for high-pressure steam generation) can be utilized for the partial heating of, for example, combustion air, for the reheating of the gases from the intermediate absorption and/or for the partial heating/preheating of feedwater before it enters the thermal deaeration.

In particular low-pressure steam, for example saturated steam at a pressure of approximately 10 bar, is used for the thermal deaeration.

It is also possible for demineralized water to be used as feedwater.

If, in a plant according to the invention, there is a device for generating low-pressure steam, it is preferable for the low-pressure steam to be at least partially fed to the deaerator. The pressure of the low-pressure steam is in this case kept at a level which is above the pressure of the device for thermal deaeration.

According to a preferred configuration of the invention, the absorbers and a drying tower for drying air with the aid of sulphuric acid are connected to a common pump system for supplying sulphuric acid, as described in the Applicant's DE 10 2004 012 293.8.

In this case, it is preferable for the heat recovery apparatus, which is intended to cool the gas prior to the intermediate absorption, to have a gas bypass.

If a separate hot absorber is provided, this too has a gas bypass according to the invention.

The invention is explained in more detail below on the basis of exemplary embodiments and the drawing. All the features described and/or illustrated in the figures, either on their own or in any desired combination, form the subject matter of the invention, irrespective of the way in which they are summarized in the claims or the way in which the claims are referred back.

DESCRIPTION OF THE PREFERRED EXEMPLARY EMBODIMENTS

EXAMPLE 1

Figure 1:
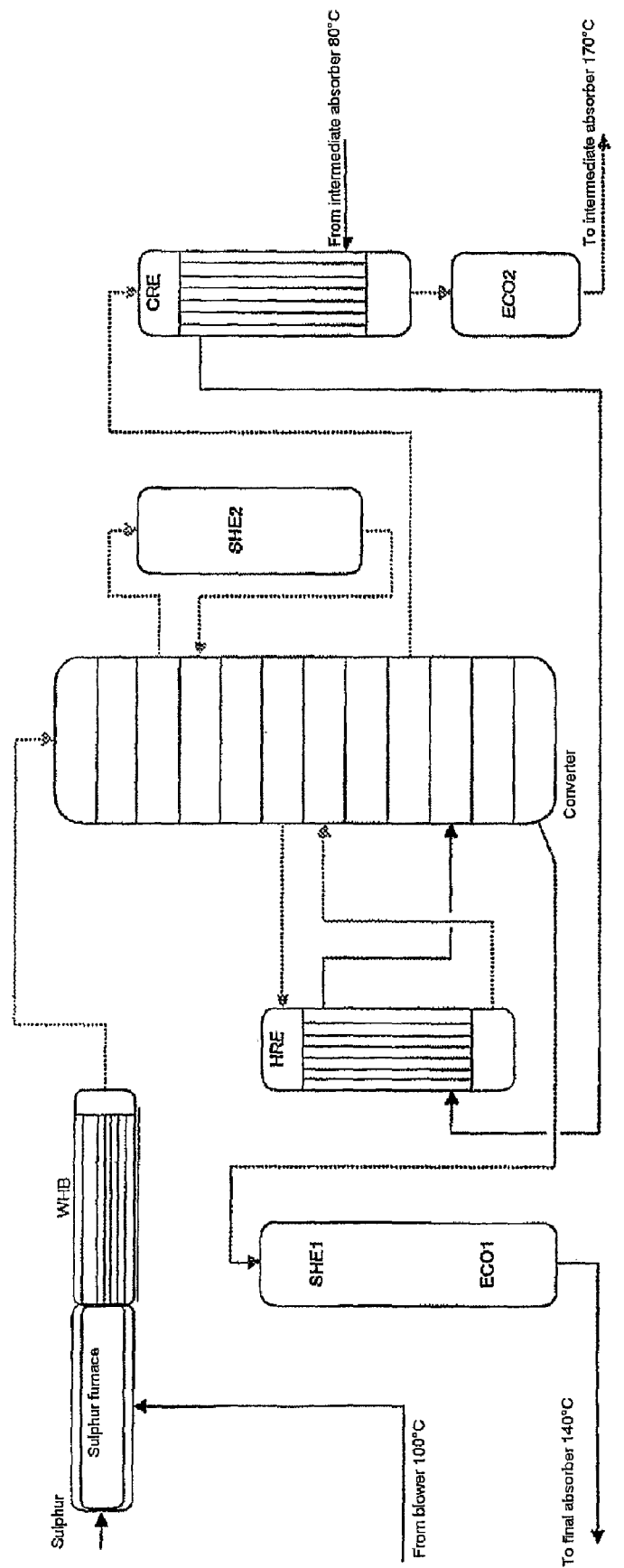
FIG. 1 diagrammatically depicts a conventional double catalysis contact plant for the production of sulphuric acid.

FIG. 1 shows a conventional double catalysis contact plant, in which the economizers ECO1 and ECO2 are each arranged directly in the gas stream upstream of the final absorption and intermediate absorption, respectively. The gas outlet temperature is typically 140° C. at the outlet of ECO1 and 170° C. at the outlet of ECO2, with the two economizers being connected either in series or in parallel on the water side, and the boiler feedwater fed to the plant being at a temperature of typically 105° C.

EXAMPLE 2

Figure 2:
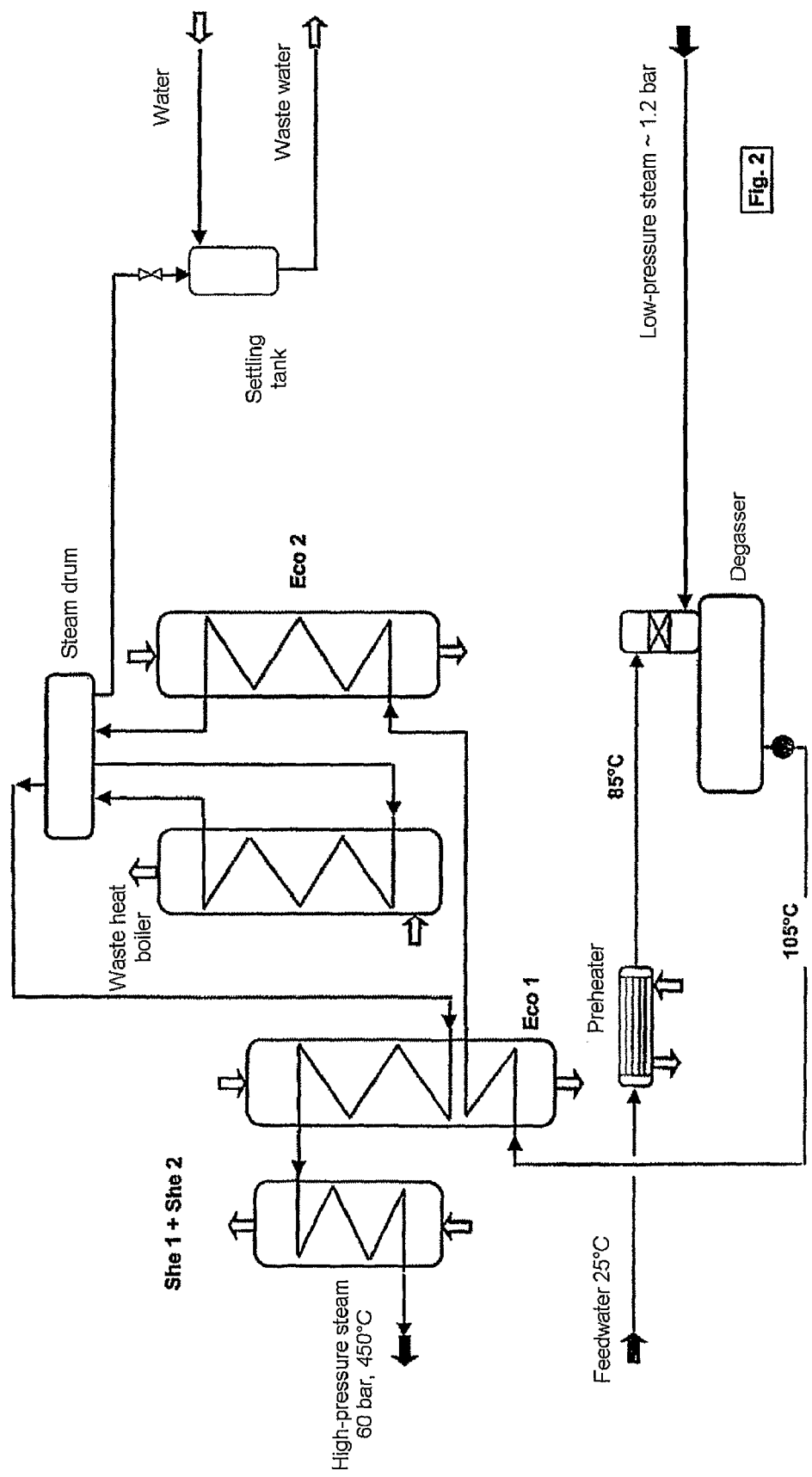
FIG. 2 shows the water or steam circuit of a plant as shown in FIG. 1, FIG. 3 diagrammatically depicts a plant for producing sulphuric acid by the process according to the invention.

FIG. 2 shows the corresponding conventional water or steam circuit. The preheater shown in the feedwater inlet is in this case fed on the shell side with hot sulphuric acid from the absorption part, with acid temperatures of 60-120° C. typically occurring and the feedwater being heated from typically 20-40° C. to approx. 85-90° C.

EXAMPLE 3

Figure 3:
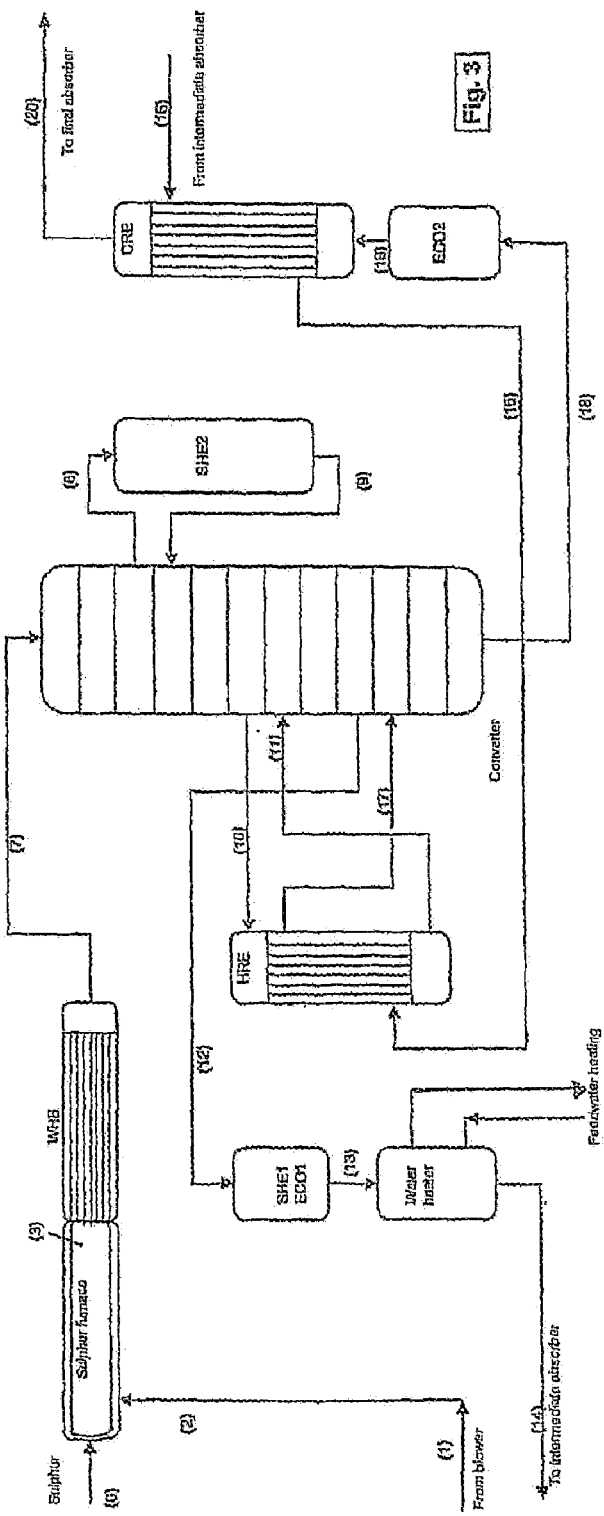

FIG. 3 shows a double catalysis contact plant, in which the economizers ECO1 and ECO2 are arranged in such a way that they can be fed either in series or in parallel with boiler feedwater at typically 175°, and consequently the gas outlet temperatures at these apparatuses cannot be lower than this temperature of the boiler feedwater, but rather are typically 200° C. and 334° C., respectively. The residual gas heat is in this case utilized to partially heat the gas from the intermediate absorption in the CRE and/or to preheat or heat demineralized water. The gas temperature upstream of the intermediate or final absorption is typically 160° C. at the water heater and 140° C. at the heat exchanger CRE, which means therefore that the heat quantity transferred to the high-pressure steam generators (WHB, 1, ECO2, SHE1, SHE2) within the contact system is identical to that of Example 1. The water heater mentioned in FIG. 3 in this case serves to preheat the "cold" feedwater prior to the thermal deaeration, or alternatively to utilize the heat in other ways, for example heating of imported water. Table 1 shows the respective gas compositions and flows for a sulphuric acid plant with a capacity of 3000 t/day. (The numbers given in line 1 of Tables 1 to 8 in each case relate to the points denoted by the corresponding number in the associated figure).

EXAMPLE 4

Figure 4:
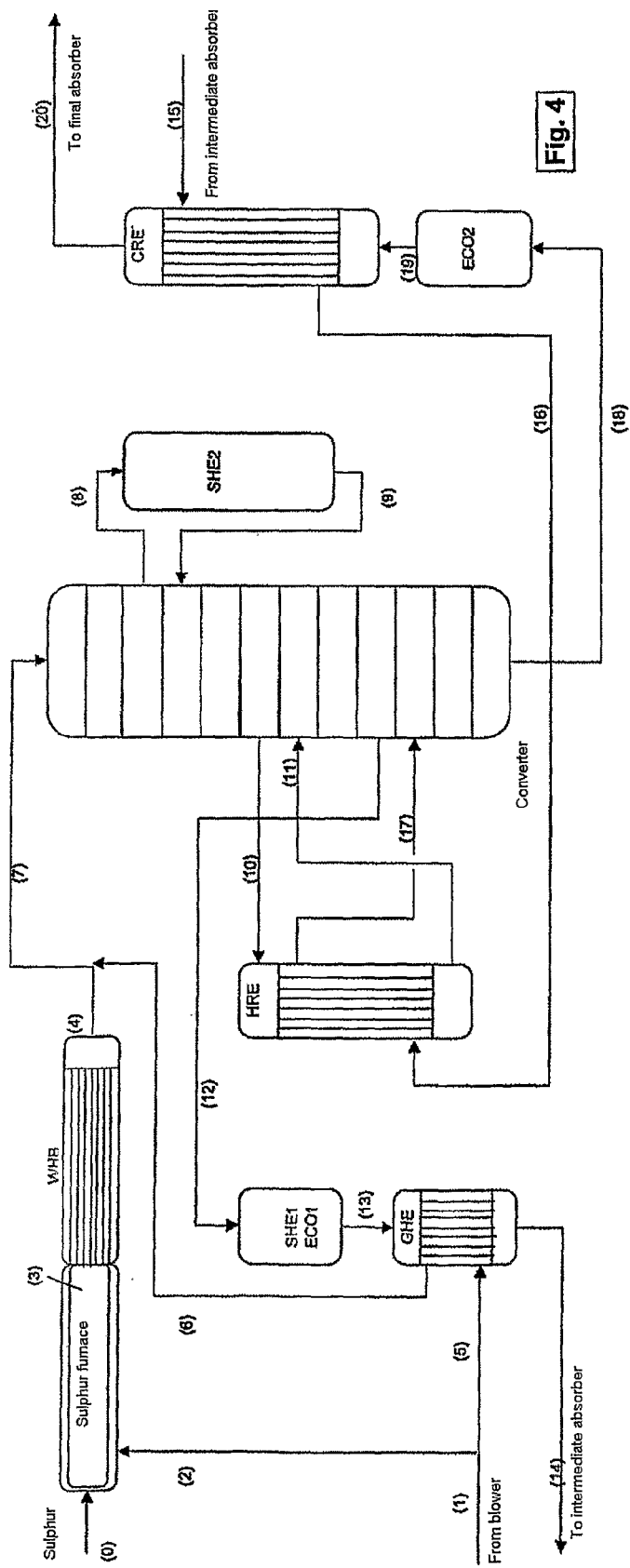
FIG. 4 shows a variant of the plant shown in FIG. 3.

FIG. 4 shows a double catalysis contact plant in accordance with Example 3, except that, with otherwise identical parameters, the water heater is replaced by a heat exchanger GHE which is used to preheat some of the air required in the plant. The arrangement then typically corresponds to the application if, for example, the sulphur combustion is carried out with $SO_2$ concentrations (e.g. 17-18% by volume) which are above the concentration fed to the contact system (e.g. 11.8% by volume), and therefore further air is required for dilution, which is then preheated in the GHE as described above. The $SO_3$-side gas outlet temperature is typically 173° C. at the GHE and 140° C. at the heat exchanger CRE, which means that the quantity of heat transferred to the high-pressure steam generators (WHB, ECO1, ECO2, SHE1, SHE2) within the contact system is therefore approximately identical to the quantity in accordance with Example 1. Table 2 shows the respective gas compositions and flows for a sulphuric acid plant with a capacity of 3000 t/day.

EXAMPLE 5

Figure 5:
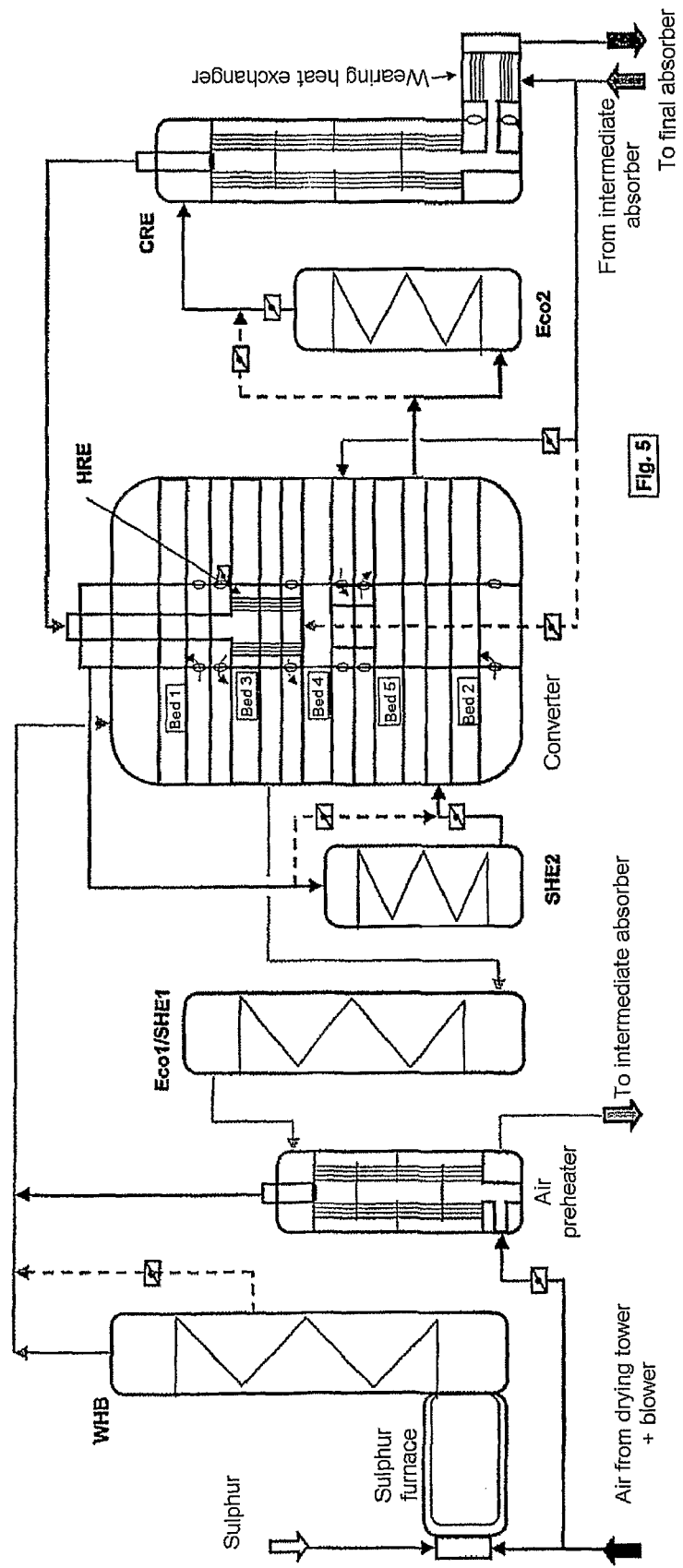
FIG. 5 shows a further modification to a plant according to the invention.

FIG. 5 shows a detailed illustration of a double catalysis contact system, similar to Example 4, but with a total of 5 contact levels, a heat exchanger integrated in the converter and quench cooling between the contact stages 4 and 5, with a wearing heat exchanger connected upstream of the outer CRE. The air preheater has the same function as the GHE in Example 4. The plant is equipped with corresponding bypasses (indicated by dashed lines) to control the temperatures at the inlet into the respective catalyst beds. The gas outlet temperatures to the intermediate and final absorption are approximately identical to those in Example 4.

EXAMPLE 6

Figure 6:
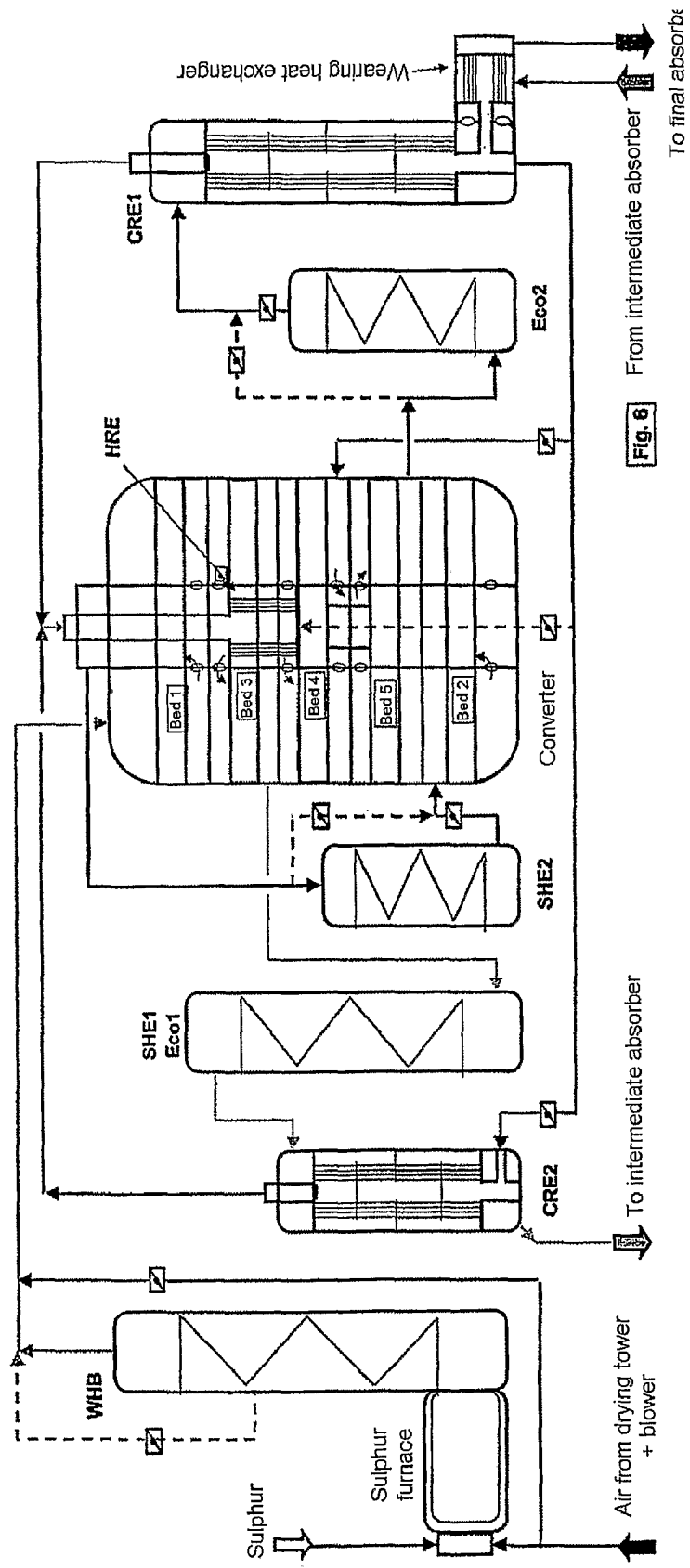
FIG. 6 shows a variant on the plant shown in FIG. 4.

FIG. 6 shows a double catalysis contact system in accordance with Example 4, in which with otherwise identical parameters the heat exchanger (air preheater in Example 5) is used not to preheat dilution air but rather to partially reheat the gases from the intermediate absorber (now CRE2). This arrangement then typically corresponds to the application if for example the sulphur combustion is operated with the same or a slightly higher concentration (e.g. 11-13% by volume) as the gas which is fed to the contact system (e.g. 11.5% by volume). In this case, the heat exchangers CRE1 and CRE2 are connected in parallel on the $SO_2$ gas side. The $SO_3$-side gas outlet temperature is typically 170° C. at CRE2 and 140° C. at heat exchanger CRE1, which means that the heat quantity transferred to the high-pressure steam generators (WHB, ECO1, ECO2, SHE1, SHE2) within the contact system is therefore approximately identical to the quantity in accordance with Example 2.

EXAMPLE 7

Figure 7:
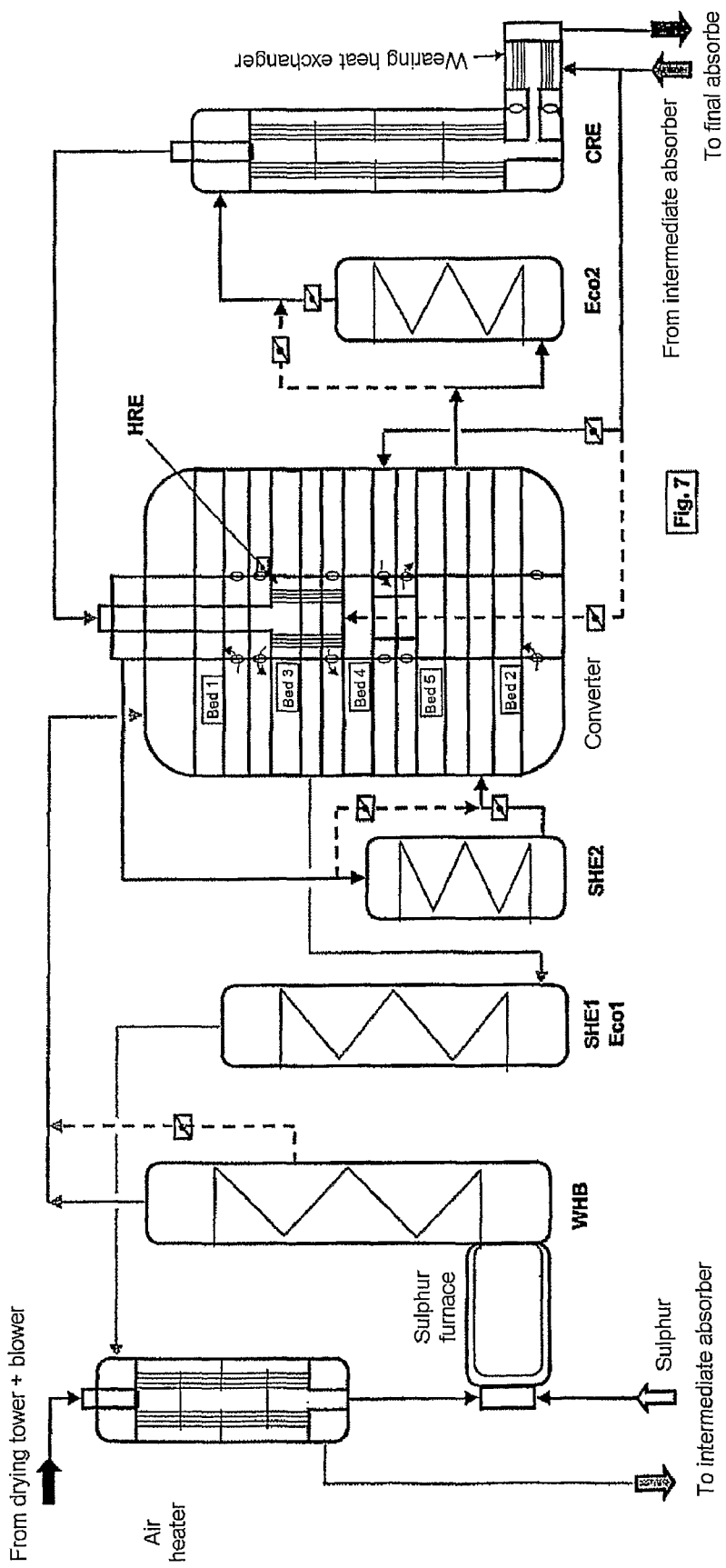
FIG. 7 shows a variant on the plant shown in FIG. 5.

FIG. 7 shows an alternative embodiment of Example 5, in which the air which has been preheated in the air heater is entirely passed into the combustion furnace for combustion of the sulphur. In this case too, the gas outlet temperatures to the intermediate and final absorption are approximately identical to Example 6.

EXAMPLE 8

Figure 8:
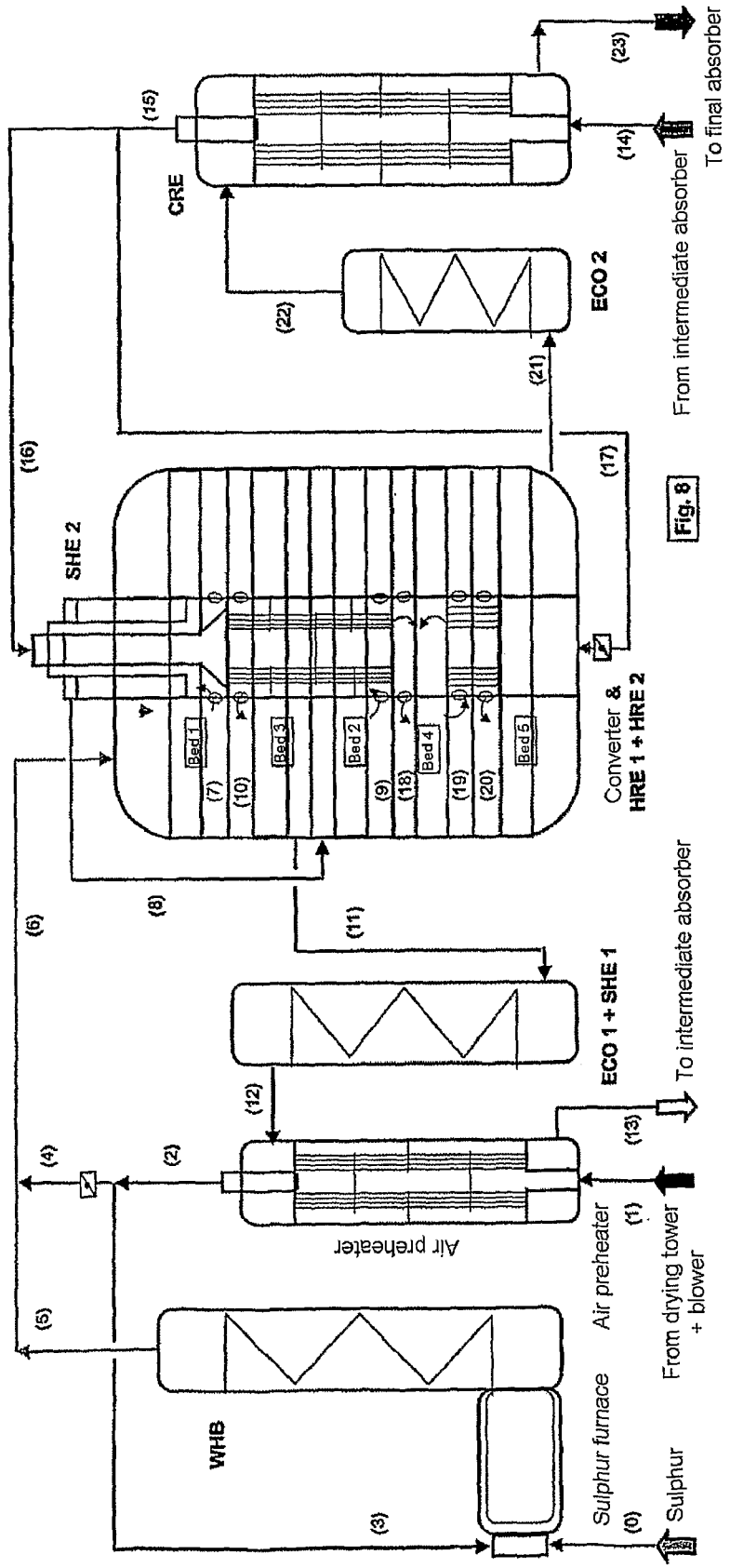
FIG. 8 shows a further modification to a plant according to the invention.

FIG. 8 shows another embodiment of Example 5 with a 5-stage contact system and two heat exchangers located within the converter for re-heating the gases following the intermediate absorber, and in addition the steam super heater SHE2 integrated in the converter. The air which has been preheated in the air preheater is partially passed for sulphur combustion and partially utilized for further dilution of the combustion gases. This example constitutes a typical embodiment of the present invention. Table 3 shows the respective gas compositions and flows for a sulphuric acid plant with a capacity of 3000 t/day.

EXAMPLE 9

Figure 9:
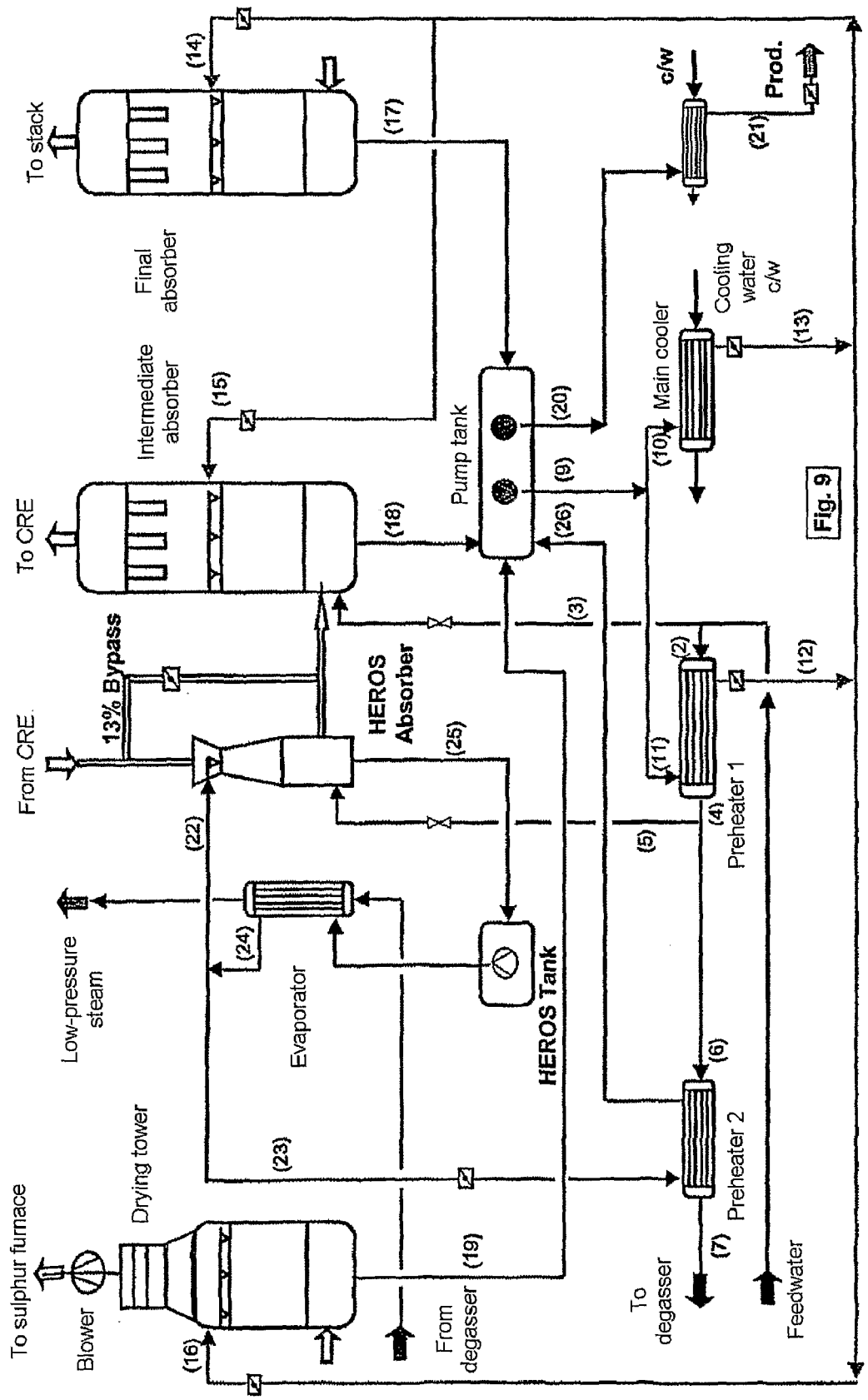
FIG. 9 shows a drying and absorption plant for use with one of the plants shown in FIG. 3 to 8.

FIG. 9 shows the drying and absorption system belonging to the contact system of Examples 3-8, with a heat recovery system "HEROS" (from HEat RecOvery System) for the generation of low-pressure steam being integrated. According to the process of the invention, all the acid circuits of the towers, i.e. drying tower, intermediate absorber and final absorber, are designed as a common circuit with the same acid concentration and the same acid feed temperature. Only the HEROS absorber is equipped with its own acid circuit, with the temperature level here being significantly higher than in the abovementioned acid circuit, specifically so high that low-pressure steam at typically 6-10 bar can be produced directly in the evaporator. Also, the gas bypass around the "HEROS" absorber in accordance with patent application DE 10 2004 012 293.8 is illustrated, which is hereby, in particular to the extent illustrated, incorporated in the subject matter of the present application. Table 4 shows the temperatures, concentrations and flows for a sulphuric acid plant with a capacity of 3000 t/day.

EXAMPLE 10

Figure 10:
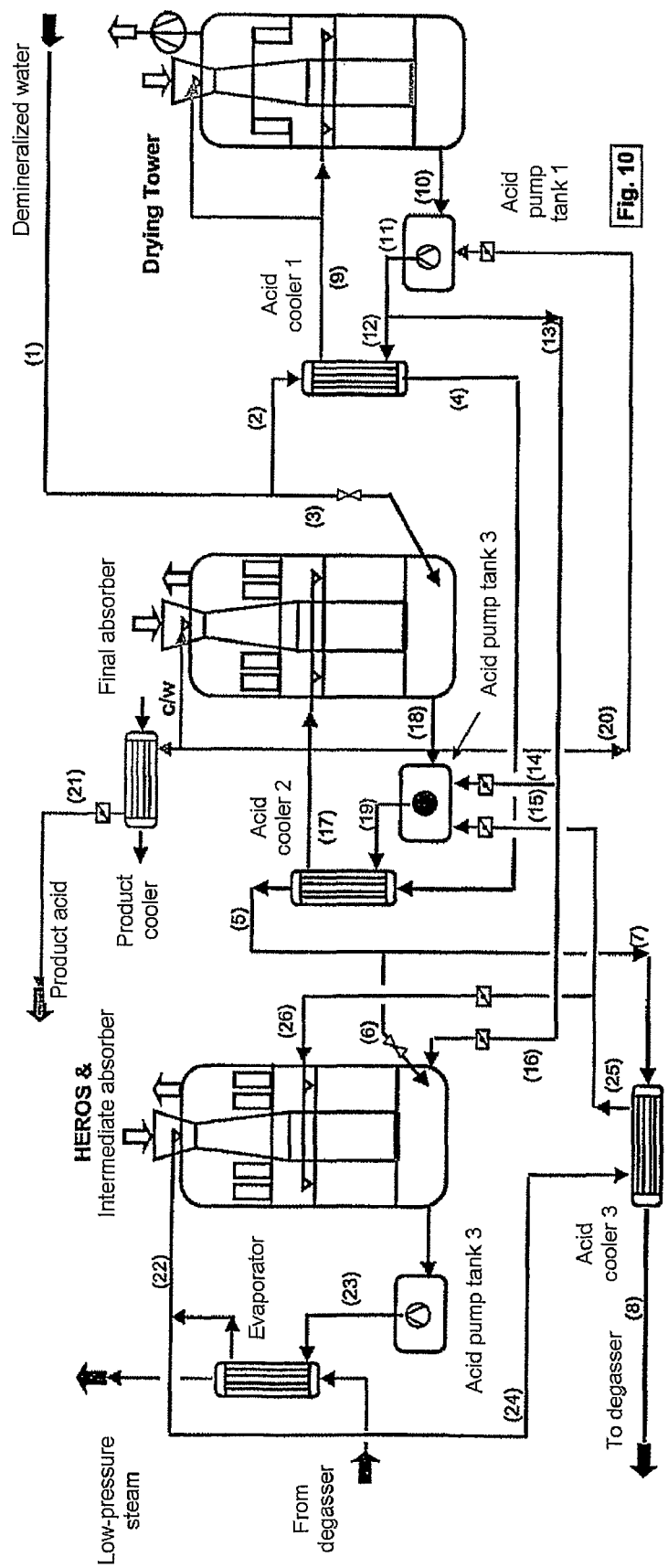
FIG. 10 shows a modification to the plant shown in FIG. 9.

FIG. 10, like Example 9, shows the integration of the heat recovery by means of "HEROS", but in this case with an arrangement which is applied in particular for large plants, i.e. with a capacity of over 3000 t/d, although it can in principle also be applied to smaller plants. All the absorbers and the drying tower are designed as integrated venturi packed towers, the intention being to improve the gas distribution. In this case, the heat to be dissipated from the drying tower and the two $SO_3$ absorbers is also completely recovered. In this case, only a small proportion is still removed from the system by means of cooling water, i.e. only the cooling of the product acid. The plant circuit according to this example can belong to any contact system as shown in Examples 3-8. Table 5 shows the respective temperatures, concentrations and flows for a sulphuric acid plant with a capacity of 3000 t/day.

EXAMPLE 11

Figure 11:
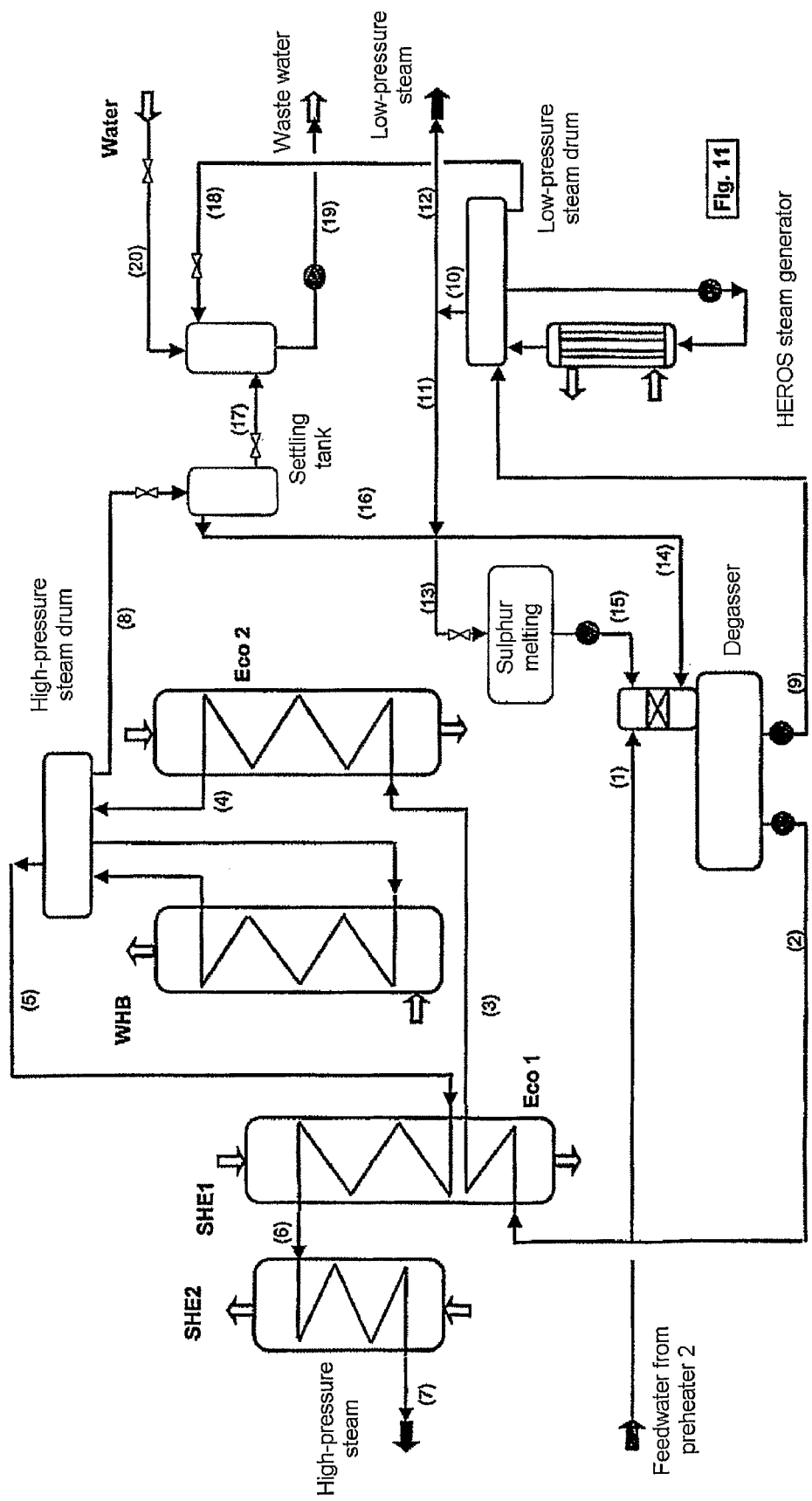
FIG. 11 shows the steam and water arrangement of the high-pressure and low-pressure steam generation of the plants shown in FIGS. 3 to 8 with a drying and absorption plant as shown in FIG. 9.

FIG. 11 shows the steam and water arrangement/circuit of the individual elements of the high-pressure and low-pressure steam generation as typically arranged when using the contact system in accordance with Examples 3-8 and in combination with the drying and absorption system in accordance with Example 9. The starting point in this context is for the deaerator to be operated at 9 bar. The demineralized water, before it enters the deaerator, is preheated within the drying and absorption system, in this case to 98° C. at the outlet of the preheater 2. Table 6 shows the respective temperatures, concentrations and flows for a sulphuric acid plant with a capacity of 3000 t/day.

EXAMPLE 12

Figure 12:
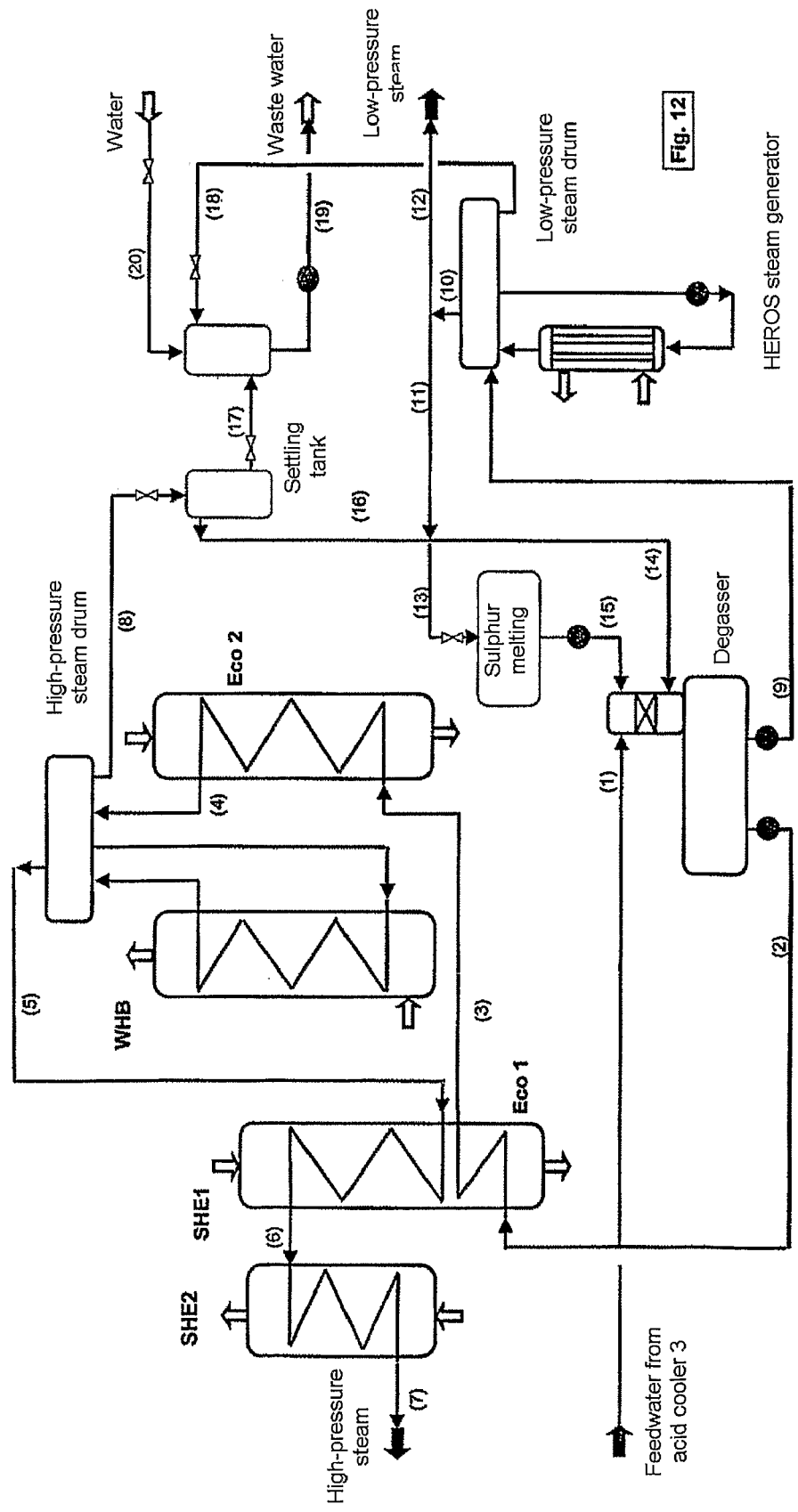
FIG. 12 shows the steam and water arrangement of the high-pressure and low-pressure steam generation of the plants shown in FIG. 3 to 8 with a drying and absorption plant as shown in FIG. 10.

FIG. 12 shows the steam and water arrangement/circuit of the individual elements of the high-pressure and low-pressure steam generation as typically arranged when using the contact system shown in Examples 3-8 and in combination with the drying and absorption system in accordance with Example 10. The starting point in this case is for the deaerator to be operated at 9 bar. Within the drying and absorption system and before it enters the deaerator, the demineralized water is in this case preheated to 166° C. at the outlet of the acid cooler 3. Table 7 shows the respective temperatures, concentrations and flows for a sulphuric acid plant with a capacity of 3000 t/day.

EXAMPLE 13

Figure 13:
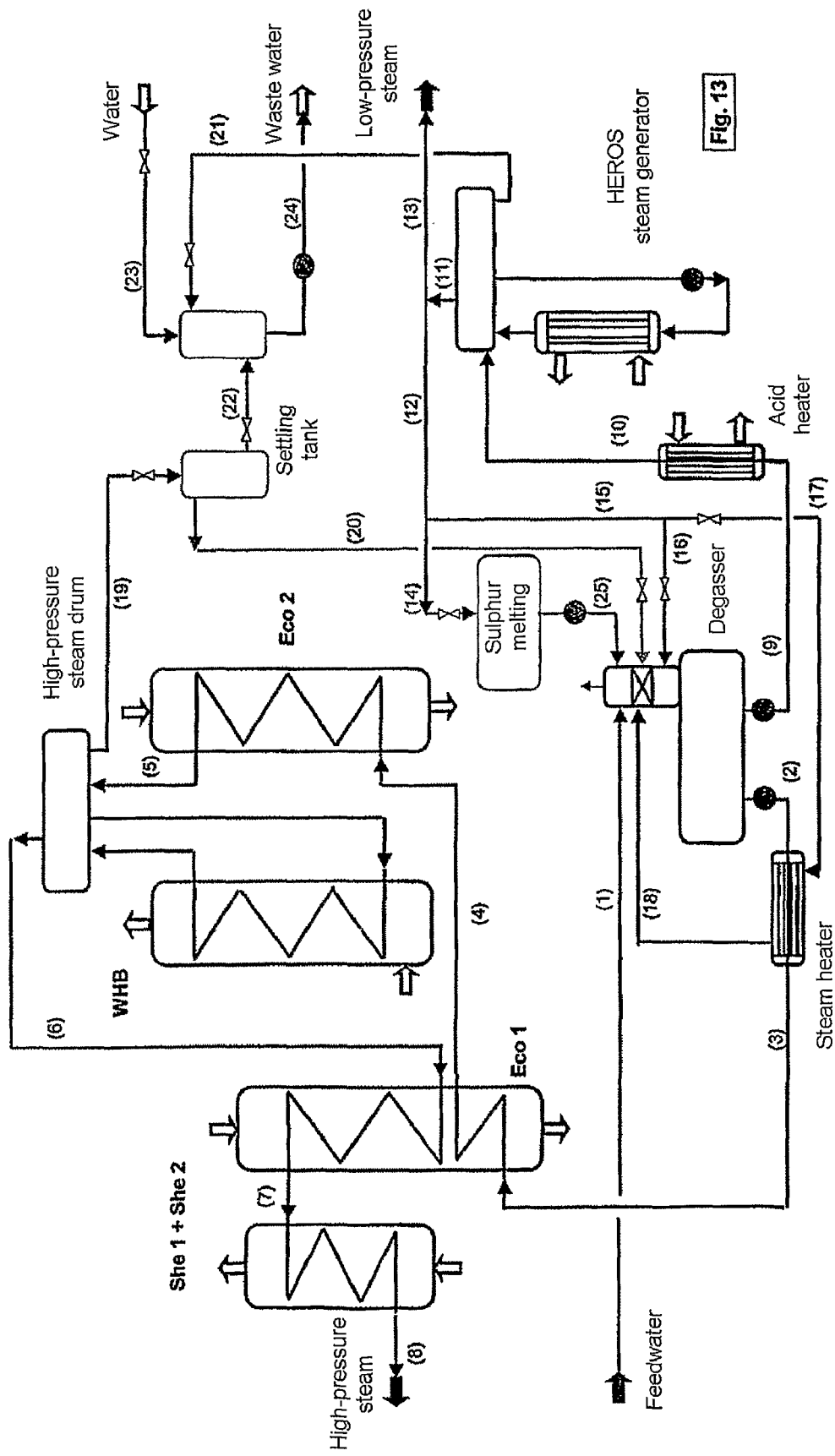
FIG. 13 shows the steam and water arrangement of the high-pressure and low-pressure steam generation of the plants shown in FIG. 3 to 8 with a drying and absorption plant as shown in FIG. 9 with a modified form of operation.

FIG. 13 shows the steam and water arrangement/circuit of the individual elements of the high-pressure and low-pressure steam generation as typically arranged when using the contact system in accordance with Examples 3-8 and in combination with the drying and absorption system in accordance with Example 9. The starting point is in this case for the deaerator to be operated atmospherically, i.e. at approx. 0.1 bar and equivalent approx. 105° C. and for the boiler feedwater for high-pressure steam generation to be heated by means of low-pressure steam in the steam heater heat exchanger. The boiler feedwater for the low-pressure steam generation is preheated by means of hot acid in the preheater 2. No data table is given, since the results are similar to those achieved in Example 11 or 12.

EXAMPLE 14

Figure 14:
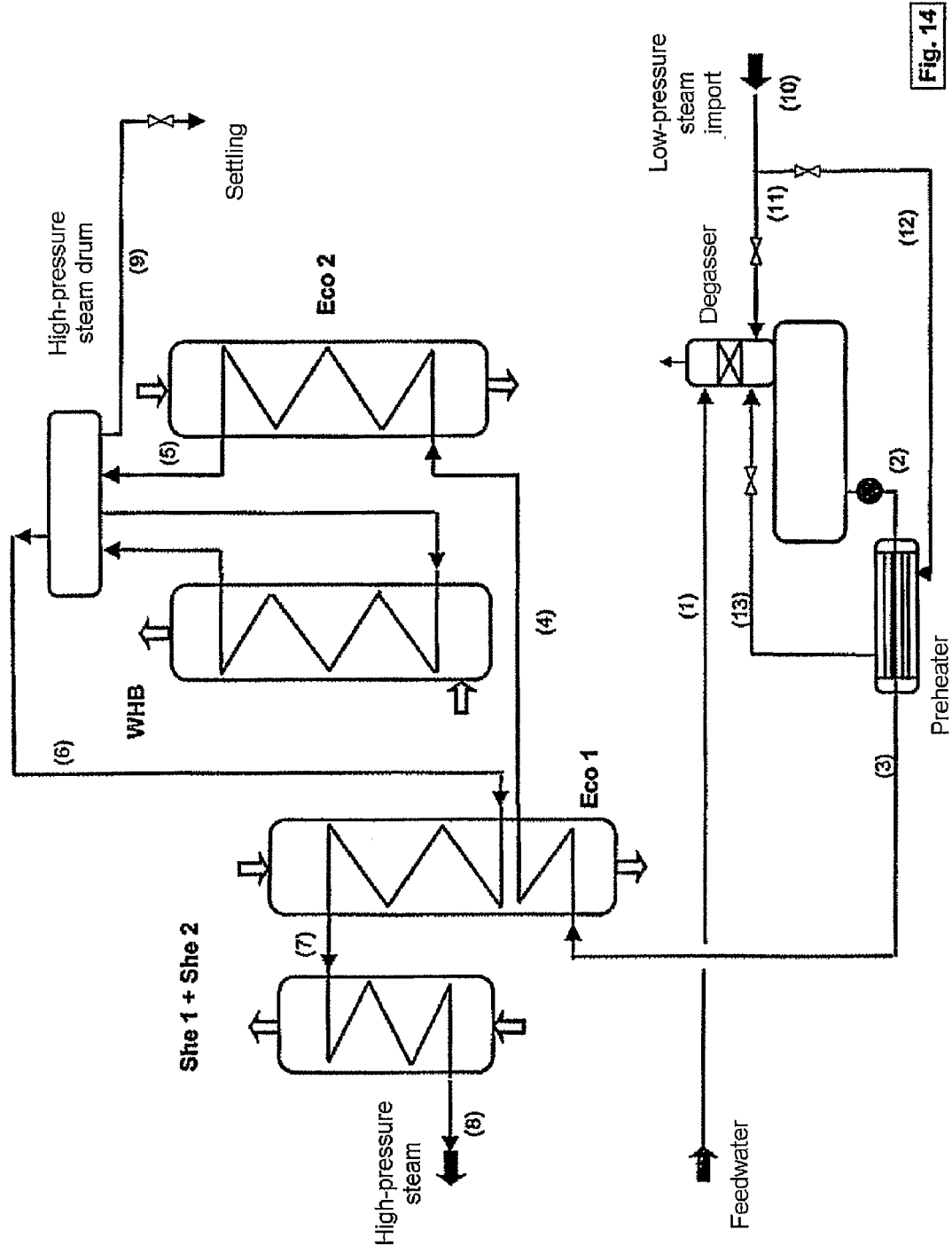
FIG. 14 shows the steam and water arrangement of the high-pressure and low-pressure steam generation of the plants shown in FIGS. 3 to 8 with a conventional drying and absorption plant.

FIG. 14 shows the steam and water arrangement/circuit of the individual elements of the high-pressure and low-pressure steam generation as typically arranged when using the contact system in accordance with Examples 3-8 and in conjunction with a conventional drying and absorption system without additional low-pressure steam production HEROS, with the feedwater temperature consequently being typically 85° C. In this context, it has likewise been assumed that the deaerator is operated atmospherically, i.e. at approximately 0.1 bar and equivalent approx. 102° C., and the boiler feedwater for high-pressure steam generation is heated by means of imported low-pressure steam in the preheater heat exchanger. Table 8 shows the respective temperatures, concentrations and flows for a sulphuric acid plant with a capacity of 3000 t/day.

TABLE 1

| Number | | 0 | 1 | 2 | 3 | 7 | 8 |
|---|---|---|---|---|---|---|---|
| Sulphur | kg/h | 40948 | — | — | — | — | — |
| Gas | m³/h(s.t.p.) | — | 237 546 | 237 546 | 236 905 | 236 905 | 228 415 |
| $SO_2$ | %-vol. | — | 0 | 0 | 11.8 | 11.8 | 4.95 |
| $SO_3$ | %-vol. | — | 0 | 0 | 0 | 0 | 7.3 |
| $O_2$ | %-vol. | — | 20.9 | 20.9 | 8.89 | 8.89 | 5.49 |
| $N_2$ | %-vol. | — | 79.1 | 79.1 | 79.31 | 79.31 | 82.26 |
| Temperature | ° C. | 135 | 95 | 95 | 1 141.30 | 420 | 620.8 |
| Enthalpy | kcal/Nm³ | — | 29.74 | 29.74 | 418.97 | 142.98 | 225.15 |

| Number | | 9 | 10 | 11 | 12 | 13 | 14 |
|---|---|---|---|---|---|---|---|
| Sulphur | kg/h | — | — | — | — | — | — |
| Gas | m³/h(s.t.p.) | 228 415 | 224 764 | 224 764 | 223.453 | 223 453 | 223.453 |
| $SO_2$ | %-vol. | 4.95 | 1.85 | 1.85 | 0.71 | 0.71 | 0.71 |
| $SO_3$ | %-vol. | 7.3 | 10.6 | 10.6 | 11.82 | 11.82 | 11.82 |
| $O_2$ | %-vol. | 5.49 | 3.95 | 3.95 | 3.38 | 3.38 | 3.38 |
| $N_2$ | %-vol. | 82.26 | 83.6 | 83.6 | 84.09 | 84.09 | 84.09 |
| Temperature | ° C. | 435 | 522.3 | 430 | 461.6 | 200 | 160 |
| Enthalpy | kcal/Nm³ | 154.06 | 190.27 | 154.74 | 167.85 | 70.02 | 55.65 |

| Number | | 15 | 16 | 17 | 18 | 19 | 20 |
|---|---|---|---|---|---|---|---|
| Sulphur | kg/h | — | — | — | — | — | — |
| Gas | m³/h(s.t.p.) | 197 046 | 197 046 | 197 046 | 196 266 | 196 266 | 196 266 |
| $SO_2$ | %-vol. | 0.8 | 0.8 | 0.8 | 0.028 | 0.028 | 0.028 |
| $SO_3$ | %-vol. | 0 | 0 | 0 | 0.78 | 0.78 | 0.78 |
| $O_2$ | %-vol. | 3.84 | 3.84 | 3.84 | 3,455 | 3,455 | 3,455 |
| $N_2$ | %-vol. | 95.36 | 95.36 | 95.36 | 79,314 | 95,737 | 95,737 |
| Temperature | ° C. | 90 | 286 | 410 | 434.8 | 334.4 | 140 |
| Enthalpy | kcal/Nm³ | 28.22 | 90.52 | 131.06 | 139.86 | 106.66 | 44.12 |

Numbers 4-6 not given

TABLE 2

| Number | | 0 | 1 | 2 | 3 | 4 | 5 | 6 |
|---|---|---|---|---|---|---|---|---|
| Sulphur | kg/h | 40948 | — | — | — | — | — | — |
| Gas | m³/h(s.t.p.) | — | 235 555 | 165 081 | 164 440 | 164 440 | 70 474 | 70 474 |
| $SO_2$ | %-vol. | — | 0 | 0 | 17 | 17 | 0 | 0 |
| $SO_3$ | %-vol. | — | 0 | 0 | 0 | 0 | 0 | 0 |
| $O_2$ | %-vol. | — | 20.9 | 20.9 | 3.59 | 3.59 | 20.9 | 20.9 |
| $N_2$ | %-vol. | — | 79.1 | 79.1 | 79.41 | 79.41 | 79.1 | 79.1 |
| Temperature | ° C. | 135 | 95 | 95 | 1 521.80 | 506.2 | 95 | 190 |
| Enthalpy | kcal/Nm³ | — | 29.74 | 29.74 | 590.5 | 178.74 | 29.74 | 59.76 |

| Number | | 7 | 8 | 9 | 10 | 11 | 12 | 13 |
|---|---|---|---|---|---|---|---|---|
| Sulphur | kg/h | — | — | — | — | — | — | — |
| Gas | m³/h(s.t.p.) | 234 914 | 226 476 | 226 476 | 222 825 | 222 825 | 221 492 | 221.492 |
| $SO_2$ | %-vol. | 11.9 | 5.04 | 5.04 | 1.91 | 1.91 | 0.74 | 0.74 |
| $SO_3$ | %-vol. | 0 | 7.31 | 7.31 | 10.65 | 10.65 | 11.9 | 11.9 |
| $O_2$ | %-vol. | 8.78 | 5.38 | 5.38 | 3.82 | 3.82 | 3.24 | 3.24 |
| $N_2$ | %-vol. | 79.32 | 82.27 | 82.27 | 83.62 | 83.62 | 84.12 | 84.12 |
| Temperature | ° C. | 420 | 621.1 | 435 | 523 | 430 | 462.4 | 200 |
| Enthalpy | kcal/Nm³ | 143.05 | 225.42 | 154.15 | 190.68 | 154.85 | 168.3 | 70.07 |

| Number | | 14 | 15 | 16 | 17 | 18 | 19 | 20 |
|---|---|---|---|---|---|---|---|---|
| Sulphur | kg/h | — | — | — | — | — | — | — |
| Gas | m³/h(s.t.p.) | 221 492 | 195 142 | 195 142 | 195 142 | 194 332 | 194 332 | 194.332 |
| $SO_2$ | %-vol. | 0.74 | 0.84 | 0.84 | 0.84 | 0.027 | 0.027 | 0.027 |
| $SO_3$ | %-vol. | 11.9 | 0 | 0 | 0 | 0.818 | 0.818 | 0.818 |
| $O_2$ | %-vol. | 3.24 | 3.68 | 3.68 | 3.68 | 3.275 | 3.275 | 3.275 |
| $N_2$ | %-vol. | 84.12 | 95.48 | 95.48 | 95.48 | 79.316 | 95.879 | 95.879 |
| Temperature | ° C. | 173.5 | 90 | 279.7 | 405 | 431 | 328.2 | 140 |
| Enthalpy | kcal/Nm³ | 60.52 | 28.23 | 88.51 | 129.42 | 138.65 | 104.66 | 44.13 |

TABLE 3

| Number | | 0 | 1 | 2 | 3 | 4 | 5 |
|---|---|---|---|---|---|---|---|
| Sulphur | kg/h | 40948 | — | — | — | — | — |
| Gas | m³/h(s.t.p.) | — | 237 541 | 237 541 | 155 942 | 81 599 | 155 301 |

TABLE 3-continued

| | | | | | | | |
|---|---|---|---|---|---|---|---|
| SO$_2$ | %-vol. | — | 0 | 0 | 0 | 0 | 18 |
| SO$_3$ | %-vol. | — | 0 | 0 | 0 | 0 | 0 |
| O$_2$ | %-vol. | — | 20.9 | 20.9 | 20.9 | 20.9 | 2.57 |
| N$_2$ | %-vol. | — | 79.1 | 79.1 | 79.1 | 79.1 | 79.43 |
| Temperature | °C. | 135 | 115 | 168.4 | 168.4 | 168.4 | 543.3 |

| Number | | 6 | 7 | 8 | 9 | 10 | 11 |
|---|---|---|---|---|---|---|---|
| Sulphur | kg/h | — | — | — | — | — | — |
| Gas | m$^3$/h(s.t.p.) | 236 900 | 228 349 | 228 349 | 224 779 | 224 779 | 223 633 |
| SO$_2$ | %-vol. | 11.8 | 4.9 | 4.9 | 1.87 | 1.87 | 0.79 |
| SO$_3$ | %-vol. | 0 | 7.35 | 7.35 | 10.59 | 10.59 | 11.73 |
| O$_2$ | %-vol. | 8.89 | 5.46 | 5.46 | 3.96 | 3.96 | 3.44 |
| N$_2$ | %-vol. | 79.31 | 82.28 | 82.28 | 83.59 | 83.59 | 84.04 |
| Temperature | °C. | 420 | 622.9 | 440 | 525.5 | 430 | 463.1 |

| Number | | 12 | 13 | 14 | 15 | 16 | 17 |
|---|---|---|---|---|---|---|---|
| Sulphur | kg/h | — | — | — | — | — | — |
| Gas | m$^3$/h(s.t.p.) | 223 633 | 223 633 | 197 394 | 197 394 | 180 186 | 17 208 |
| SO$_2$ | %-vol. | 0.79 | 0.79 | 0.89 | 0.89 | 0.89 | 0.89 |
| SO$_3$ | %-vol. | 11.73 | 11.73 | 0 | 0 | 0 | 0 |
| O$_2$ | %-vol. | 3.44 | 3.44 | 3.9 | 3.9 | 3.9 | 3.9 |
| N$_2$ | %-vol. | 84.04 | 84.04 | 95.21 | 95.21 | 95.21 | 95.21 |
| Temperature | °C. | 200 | 150 | 82 | 274 | 274 | 274 |

| Number | | 18 | 19 | 20 | 21 | 22 | 23 |
|---|---|---|---|---|---|---|---|
| Sulphur | kg/h | — | — | — | — | — | — |
| Gas | m$^3$/h(s.t.p.) | 197 394 | 196 532 | 196 532 | 196 515 | 196 515 | 196 515 |
| SO$_2$ | %-vol. | 0.89 | 0.04 | 0.04 | 0.02 | 0.02 | 0.02 |
| SO$_3$ | %-vol. | 0 | 0.86 | 0.86 | 0.88 | 0.88 | 0.88 |
| O$_2$ | %-vol. | 3.9 | 3.47 | 3.47 | 3.46 | 3.46 | 3.46 |
| N$_2$ | %-vol. | 95.21 | 95.63 | 95.63 | 95.64 | 95.64 | 95.64 |
| Temperature | °C. | 415 | 442.4 | 410 | 410.6 | 309.7 | 135 |

TABLE 4

| Number | | 1 | 2 | 3 | 4 | 5 | 6 | 7 | 9 |
|---|---|---|---|---|---|---|---|---|---|
| Acid | kg/h | 217538 | 217103 | 435 | 217103 | 18512 | 198591 | 195055 | 4436863 |
| Concentration | % H$_2$SO$_4$ | — | — | — | — | — | — | — | 98.5 |
| Temperature | °C. | 20 | 20 | 20 | 85 | 85 | 85 | 98 | 95.7 |
| Flow rate | m$^3$/h | 218 | 217.5 | 0.4 | 224 | 19.1 | 205 | 206.9 | 2519.6 |

| Number | | 10 | 11 | 12 | 13 | 14 | 15 |
|---|---|---|---|---|---|---|---|
| Acid | kg/h | 1681863 | 2755000 | 2755000 | 1681863 | 1597232 | 1419762 |
| Concentration | % H$_2$SO$_4$ | 98.5 | 98.5 | 98.5 | 98.5 | 98.5 | 98.5 |
| Temperature | °C. | 95.7 | 95.7 | 82 | 82 | 82 | 82 |
| Flow rate | m$^3$/h | 955.1 | 1564.5 | 1552.4 | 947.7 | 900 | 800 |

| Number | | 16 | 17 | 18 | 19 | 20 | 21 |
|---|---|---|---|---|---|---|---|
| Acid | kg/h | 1419762 | 1602848 | 1459270 | 1425700 | 126904 | 126904 |
| Concentration | % H$_2$SO$_4$ | 98.5 | 98.58 | 98.81 | 98.09 | 98.5 | 98.5 |
| Temperature | °C. | 82 | 90.8 | 110.4 | 85.9 | 95.7 | 40 |
| Flow rate | m$^3$/h | 800 | 907.7 | 835.9 | 804.9 | 72.1 | 69.8 |

| Number | | 22 | 23 | 24 | 25 | 26 |
|---|---|---|---|---|---|---|
| Acid | kg/h | 2607052 | 75949 | 2683000 | 2683000 | 75949 |
| Concentration | % H$_2$SO$_4$ | 98.5 | 98.5 | 98.5 | 98.5 | 98.5 |
| Temperature | °C. | 185 | 185 | 185 | 210.7 | 99 |
| Flow rate | m$^3$/h | 1560 | 45.4 | 1605.4 | 1630.6 | 43.2 |

TABLE 5

| Number | | 1 | 2 | 3 | 4 | 5 | 6 | 7 | 8 |
|---|---|---|---|---|---|---|---|---|---|
| Acid | kg/h | 239994 | 239994 | 0 | 239994 | 239994 | 18948 | 221045 | 221045 |
| Concentration | % H$_2$SO$_4$ | — | — | — | — | — | — | — | — |
| Temperature | °C. | 30 | 30 | 30 | 45.8 | 69.5 | 69.5 | 69.5 | 166.1 |
| Flow rate | m$^3$/h | 241.1 | 241.1 | 0 | 242.4 | 245.3 | 19.4 | 225.9 | 244.9 |

TABLE 5-continued

| Number | | 9 | 10 | 11 | 12 | 13 | 14 |
|---|---|---|---|---|---|---|---|
| Acid | kg/h | 1771180 | 1777115 | 2005040 | 1771180 | 233861 | 55069 |
| Concentration | % $H_2SO_4$ | 96 | 95.68 | 96 | 96 | 96 | 96 |
| Temperature | ° C. | 67 | 71.8 | 72.9 | 72.9 | 72.9 | 72.9 |
| Flow rate | m$^3$/h | 990 | 996 | 1125 | 993 | 131 | 31 |

| Number | | 15 | 16 | 17 | 18 | 19 | 20 |
|---|---|---|---|---|---|---|---|
| Acid | kg/h | 294127 | 178792 | 2271610 | 1922414 | 2271610 | 227925 |
| Concentration | % $H_2SO_4$ | 98.5 | 96 | 98.5 | 98.57 | 98.5 | 98.5 |
| Temperature | ° C. | 90 | 72.9 | 82 | 89.4 | 89 | 85 |
| Flow rate | m$^3$/h | 167 | 100 | 1280 | 1048 | 1285 | 128 |

| Number | | 21 | 22 | 23 | 24 | 25 | 26 |
|---|---|---|---|---|---|---|---|
| Acid | kg/h | 127007 | 2506780 | 3092406 | 585626 | 585626 | 291499 |
| Concentration | % $H_2SO_4$ | 98.5 | 98.5 | 98.5 | 98.5 | 98.5 | 98.5 |
| Temperature | ° C. | 40 | 185 | 204 | 185 | 90 | 90 |
| Flow rate | m$^3$/h | 70 | 1500 | 1872 | 350 | 332 | 165 |

TABLE 6

| | | Number | | | | | | |
|---|---|---|---|---|---|---|---|---|
| | Dimension | 1 | 2 | 3 | 4 | 5 | 6 | 7 |
| Flow rate | kg/h | 198 591 | 180 570 | 180 570 | 180 570 | 178 782 | 178 782 | 178 782 |
| Pressure | bar abs. | 10 | 71 | 69 | 67 | 66 | 64 | 62 |
| Temperature | ° C. | 98 | 175.4 | 235 | 266 | 281.8 | 341 | 480 |

| | | Number | | | | | | |
|---|---|---|---|---|---|---|---|---|
| | Dimension | 8 | 9 | 10 | 11 | 12 | 13 | 14 |
| Flow rate | kg/h | 1 788 | 56 927 | 56 363 | 38 541 | 17 822 | 5 601 | 33 369 |
| Pressure | bar abs. | 66 | 12 | 10 | 10 | 10 | 10 | 10 |
| Temperature | ° C. | 281.8 | 175.4 | 179.9 | 179.9 | 179.9 | 179.9 | 179.9 |

| | | Number | | | | | |
|---|---|---|---|---|---|---|---|
| | Dimension | 15 | 16 | 17 | 18 | 19 | 20 |
| Flow rate | kg/h | 5 536430 | | 1 358 564 | | 5515 | 4156 |
| Pressure | bar abs. | 10 | 10 | 9 | 10 | 1 | 1 |
| Temperature | ° C. | 90 | 179.9 | 177.7 | 179.9 | 60 | 20 |

TABLE 7

| | | Number | | | | | | |
|---|---|---|---|---|---|---|---|---|
| | Dimension | 1 | 2 | 3 | 4 | 5 | 6 | 7 |
| Flow rate | kg/h | 221 045 | 179 312 | 179 312 | 179 312 | 176 662 | 176 662 | 176 662 |
| Pressure | bar abs. | 10 | 72 | 69 | 67 | 67 | 65 | 62 |
| Temperature | ° C. | 166.1 | 175.4 | 238.3 | 265.7 | 282.8 | 338.6 | 480 |

| | | Number | | | | | | |
|---|---|---|---|---|---|---|---|---|
| | Dimension | 8 | 9 | 10 | 11 | 12 | 13 | 14 |
| Flow rate | kg/h | 2 650 | 48 946 | 48 461 | 6 579 | 41 864 | 2 393 | 4 847 |
| Pressure | bar abs. | 67 | 12 | 10 | 10 | 10 | 10 | 10 |
| Temperature | ° C. | 282.8 | 175.4 | 179.9 | 179.9 | 179.9 | 179.9 | 179.9 |

| | | Number | | | | | |
|---|---|---|---|---|---|---|---|
| | Dimension | 15 | 16 | 17 | 18 | 19 | 20 |
| Flow rate | kg/h | 2 365644 | | 2 006 485 | | 7239 | 5233 |
| Pressure | bar abs. | 10 | 10 | 9 | 10 | 1 | 1 |
| Temperature | ° C. | 90 | 179.9 | 177.7 | 179.9 | 60 | 20 |

TABLE 8

| | | Number | | | | | | |
|---|---|---|---|---|---|---|---|---|
| | Dimension | 1 | 2 | 3 | 4 | 5 | 6 | 7 |
| Flow rate | kg/h | 150487 | 179312 | 179 312 | 179 312 | 179 312 | 176 662 | 176 662 |
| Pressure | bar abs. | 2 | 72 | 71 | 69 | 67 | 67 | 65 |
| Temperature | ° C. | 85 | 102 | 175.4 | 238.3 | 265.7 | 282.8 | 338.6 |

| | | Number | | | | | | |
|---|---|---|---|---|---|---|---|---|
| | Dimension | 8 | 9 | 10 | 11 | 12 | 13 | 14 |
| Flow rate | kg/h | 176662 | 2 650 | 28 825 | 114 | | 28311 | 28311 |
| Pressure | bar abs. | 62 | 67 | 12 | 12 | 12 | 12 | |
| Temperature | ° C. | 480 | 282.8 | 188 | 188 | 188 | 188 | |

LIST OF REFERENCE NUMBERS

CRE Cold Reheat Exchanger (Gas-Gas heat exchanger)
ECO Economizer (boiler feedwater preheater)
GHE Gas Heat Exchanger (Gas-air heat exchanger)
HRE Hot Reheat Exchanger (Gas-gas heat exchanger)
WHB Waste Heat Boiler
SHE Superheater
LP Low Pressure
HP High Pressure

The invention claimed is:

1. Process for producing sulphuric acid from a process gas containing $SO_2$ comprising,
catalytically oxidizing $SO_2$ in a converter with at least one contact stage to form $SO_3$-containing process gas;
withdrawing from the converter and feeding to an apparatus for heat recovery, in which steam is generated from feedwater by means of the heat of the process gas, the $SO_3$ containing process gas, after it has passed through the at least one contact stage; and then
feeding the $SO_3$ containing process gas to an absorber in which the $SO_3$ is absorbed in sulphuric acid,
wherein the temperature of the feedwater fed to the heat recovery apparatus for steam generation is higher than the temperature of the process gas which enters the absorber.

2. Process according to claim 1, wherein the temperature difference between the feedwater and the process gas which enters the absorber is between 5° C. and 100° C., preferably 20-50° C.

3. The process as claimed in claim 1, wherein the feedwater is fed to the heat recovery apparatus at a temperature of over 102° C., preferably 140-190° C.

4. Process according to claim 1, wherein the process gas is withdrawn from the converter at an intermediate contact stage, is fed to an intermediate absorber and is then fed back in to the converter, and in that the process gas, after it has passed through the final contact stage of the converter, is fed to a final absorber, with the gas inlet temperature at the intermediate absorber being approximately 130-170° C. and at the final absorber being approximately 120-150° C.

5. Process according to claim 1, wherein the feedwater is thermally deaerated, preferably at a feed temperature of 20-90° C., before it enters the heat recovery apparatus.

6. Process according to claim 5, wherein the thermal deaeration of the feedwater is operated at a pressure higher than atmospheric pressure, preferably at 3-10 bar.

7. Process according to claim 5, wherein the feedwater is preheated to over 105° C., preferably to 130-190° C., and in particular to approximately 165° C., before it enters the thermal deaeration.

8. Process according to claim 7, wherein the maximum preheating temperature of the feedwater is approximately 5 to 20° C. below the steam saturation temperature of the pressure at which the deaerator is operated.

9. Process according to claim 7, wherein the preheating of the cold feedwater before it enters the thermal deaeration is carried out indirectly by means of waste heat from the absorption part and/or from the contact part of the sulphuric acid plant.

10. Process according to claim 1, wherein the feedwater is deaerated under atmospheric conditions, and before it enters the heat recovery apparatus is heated in a heat exchanger to a temperature above the temperature of approximately 105° C. which is caused during the deaeration.

11. Process according to claim 10, wherein the heating of the feedwater prior to the thermal deaeration is carried out, for example, by means of low-pressure steam, imported waste steam, medium-pressure steam (at a pressure lower than the high-pressure steam generated in the plant) or heated heat-transfer oil originating from outside the plant.

12. Process according to claim 1, wherein- the gases which emerge from the heat recovery apparatus are at a temperature of approximately 170-350° C.

13. Process according to claim 12, wherein the gases which emerge from the heat recovery apparatus are utilized for the partial heating of, for example, combustion air, for the reheating of the gases from the intermediate absorption and/or for the partial heating/preheating of feedwater before it enters the thermal deaeration.

14. Process according to claim 1, wherein low-pressure steam, for example saturated steam at a pressure of approximately 10 bar, is used for the thermal deaeration.

15. Process according to claim 1, wherein the absorbers and a drying tower for drying air with the aid of sulphuric acid are operated with a common acid circuit at the same concentration.

16. Process according to claim 15, wherein the sulphuric acid plant is operated with a separate hot absorber, this hot absorber being equipped with a gas bypass.

17. Process according to claim 1, wherein the heat recovery apparatus, which is intended to cool the gas prior to the intermediate absorption, has a gas bypass.

18. Process according to claim 1, wherein the feedwater used is demineralized water.

* * * * *